United States Patent [19]
Babler

[11] 3,712,432
[45] Jan. 23, 1973

[54] FRICTION CLUTCH
[75] Inventor: Egon S. Babler, Chicago, Ill.
[73] Assignee: Teletype Corp., Skokie, Ill.
[22] Filed: Feb. 18, 1971
[21] Appl. No.: 116,374

[52] U.S. Cl. ........................192/26, 192/35, 192/75
[51] Int. Cl. .........................F16d 11/06, F16d 13/14
[58] Field of Search ........192/17, 26, 35, 75, 27, 41 S

[56] References Cited

UNITED STATES PATENTS

| | | |
|---|---|---|
| 2,951,568 | 9/1960 | Hungerford, Jr. et al. ......192/41 S X |
| 2,566,539 | 9/1951 | Starkey ..............................192/41 S |
| 287,915 | 11/1883 | Elkardt................................192/75 |
| 2,635,724 | 4/1953 | Fox et al..............................192/16 |
| 2,735,525 | 2/1956 | Martindell...........................192/27 |
| 2,762,480 | 9/1956 | Knochl ..............................192/82 R |
| 3,044,590 | 7/1962 | Madsen................................192/26 |

FOREIGN PATENTS OR APPLICATIONS

| | | |
|---|---|---|
| 493,926 | 6/1953 | Canada ..............................192/26 |
| 485,543 | 10/1953 | Italy .....................................192/26 |

*Primary Examiner*—Allan D. Herrmann
*Attorney*—J. L. Landis and R. P. Miller

[57] ABSTRACT

A friction clutch, in which a constantly rotating driving drum is coupled to a driven clutch disc by a plurality of friction shoes is equipped with an arcuate spring band which is coupled to the friction shoes by a pry bar. Upon actuation of the clutch, the drum is initially engaged by the spring band whereupon movement of the band pivots the pry bar to engage the friction shoes with the drum. Since the band spring is coupled to the friction shoes, the friction shoes move into engagement with the drum at a rate and force which is directly related to the speed of the drum. By relating the force with which the friction shoes engage the drum to the speed of the drum, the shoes are prevented from initially rebounding from the drum thereby substantially reducing undesirable slippage and vibrations in the clutch.

8 Claims, 6 Drawing Figures

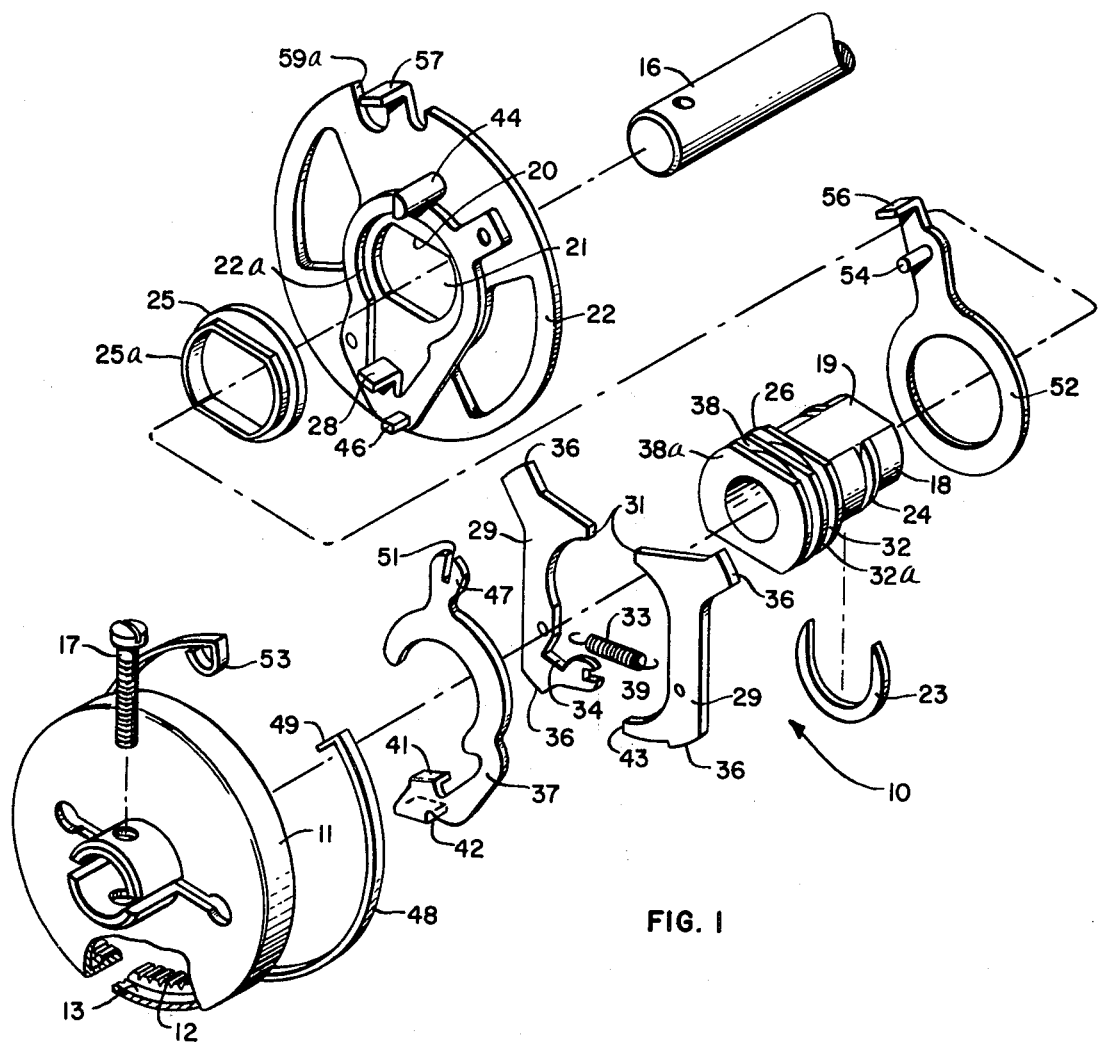

FRICTION CLUTCH

BACKGROUND OF THE INVENTION

1. Field of the Invention

This invention relates to selectively operated coupling devices such as friction clutches and more particularly to friction clutches in which rebounding and vibrations are substantially reduced when a driven member is coupled to a driving member.

2. Technical Considerations and Prior Art

It is desirable that clutches used in high speed signal controlled data recording apparatus, such as printers used with teletypewriters and electronic computers, be instantaneous in action and that there be a minimum degree of slippage between the clutch parts during engagement. Obviously, such requirements are necessary inasmuch as the efficiency of operation of the printer is dependent upon the synchronous operation of the various component devices. For example, when signal impulses are received in a teletypewriter receiver selector magnet, it is important to have a selector cam sleeve initiate rotation immediately upon the reception of the first or start signal impulse.

Furthermore, it is important to alleviate vibrations, rebounding and resulting noise caused when the clutch elements become engaged. These conditions are particularly manifest in cyclically operated one revolution clutches. Vibration and rebounding of the clutch elements result in high wear rates or ultimate failure or breakage of component clutch parts. These problems can be met by eliminating or substantially reducing the tendancy of the engaging parts of the clutch from rebounding upon initial impact.

It is therefore an object of the invention to provide a new and improved friction clutch in which slippage and vibration are substantially reduced.

SUMMARY OF THE INVENTION

With the foregoing and other objects in mind, the invention contemplates coupling a driven member to a constantly rotating driving member by utilizing friction shoes which are connected to the driven member and engage the driving member at a rate which is directly related to the rotational speed of the driving member. In the preferred embodiment of the invention, this is accomplished by utilizing a resilient member such as a band spring which is connected by an intermediate pry bar to the friction shoes to urge the friction shoes into engagement with the driving member just after the resilient member has itself engaged the driving member. Since the driving member is rotating when the resilient member engages it, the driving member will carry the resilient member along with it causing the resilient member to move at the same speed as the driving member. Inasmuch as the resilient member is coupled to the friction shoes, the rate at which the friction shoes move into engagement with the driving member is directly related to the rotational speed of the driving member.

In accordance with other features of the invention, the driving member may be a drum and the resilient member may be a circular band spring generally conforming in dimension to an inner peripheral surface or diameter of the drum. When it is desired to couple the driven member to the drum, the resilient member is partially relaxed to slightly expand its diameter and move it into engagement with the inner peripheral surface of the drum. When it is desired to uncouple the clutch, the resilient member is tensioned so as to decrease its diameter and disengage the driven member from the drum.

Other objects, advantages and features are apparent from the following detailed description and drawings.

BRIEF DESCRIPTION OF THE DRAWINGS

FIG. 1 is an exploded perspective view of individual clutch elements constructed in accordance with the principles of the present invention;

FIG. 2 is a top view of the assembled clutch of FIG. 1, with a driving drum partially broken away to show the arrangement of a driving shaft, the driving drum, and a driven disc;

DETAILED DESCRIPTION OF THE INVENTION

Figure 3:
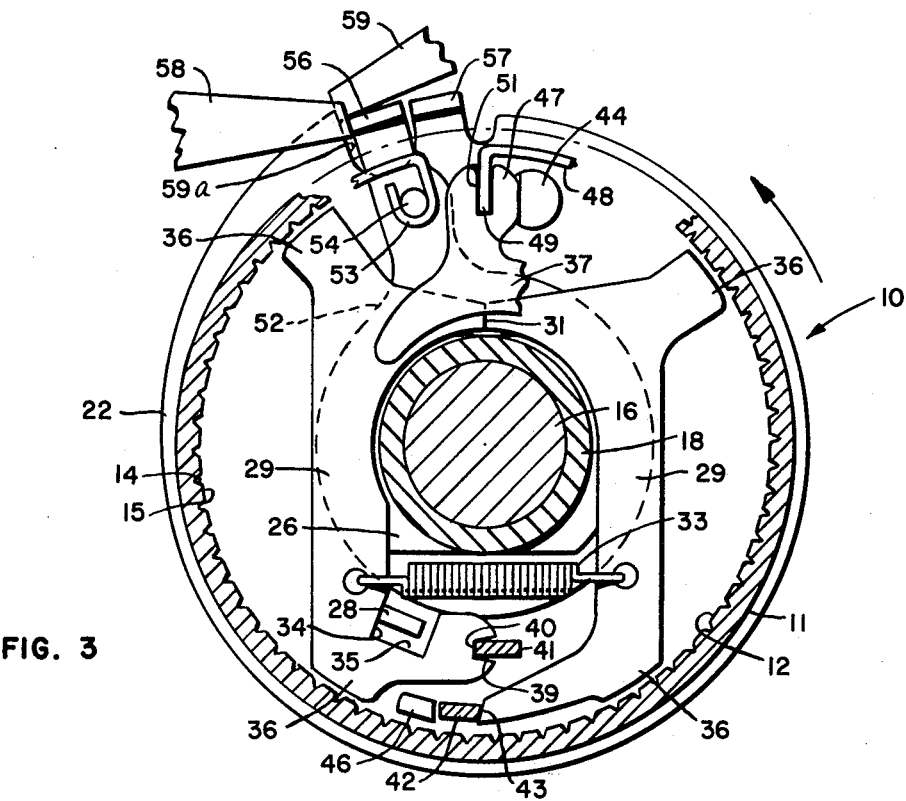
FIG. 3 is a transverse sectional view substantially along line 3—3 of FIG. 2 in the direction of the arrows and showing a pair of friction shoes disengaged from the driving drum uncoupling the driven disc from the driving drum; portions of a band spring and of a pry bar which do not fall within the section being shown in phantom.

Referring to FIGS. 1 and 2, there is shown a selectively operated coupling device or clutch 10 with a driving member in the form of a drum 11 having a pair of inner stepped diameters 12 and 13. The diameter 12 is provided with a plurality of grooves 14 to form a number of lands 15, the purpose of which is described in the patent to W. J. Zenner U.S. Pat. No. 2,678,118, issued May 11, 1954. The grooves extend parallel to the axis of the drum 11; while the inner diameter 13 of the drum 11 is smooth. The drum 11 is driven by a constantly rotating shaft 16 which is rigidly attached to the drum by a screw 17 which passes through aligned bores in the shaft and a hub section of the drum.

Rotatably mounted on and adapted for rotation independently of the shaft 16, but slightly axially displaced from engagement with the drum 11, is a sleeve 18 having keying flats 19. These flats mate with flats 20 defining a central opening 21 of a driven member which is in the form of a clutch disc 22 that is mounted on the sleeve 18 for rotation therewith. In order to retain the clutch disc 22 on the sleeve 18, a resilient U-shaped lock washer 23 is slid between the clutch disc 22 and a flange 24 projecting radially from the sleeve, thereby causing the clutch disc to abut a spacer 25 which seats in a socket 22a in said clutch disc. The spacer has a bearing flange 25a which extends axially into abutment with another radial flange 26 of sleeve 18. Thereby the clutch disc is secured to the sleeve.

The clutch disc 22 is selectively coupled to the drum 11 by a clutching device, designated generally by the numeral 27 (FIG. 2), which engages both the inner diameters 12 and 13 of the drum and a driven lug 28 (FIG. 1) which projects from the clutch disc so as to rotate the clutch disc and the selector sleeve 18 with the drum. The sleeve 18 may have various cams (not shown) mounted thereupon which drive elements of a telegraph printer with which the clutch 10 may be associated.

Figure 5:
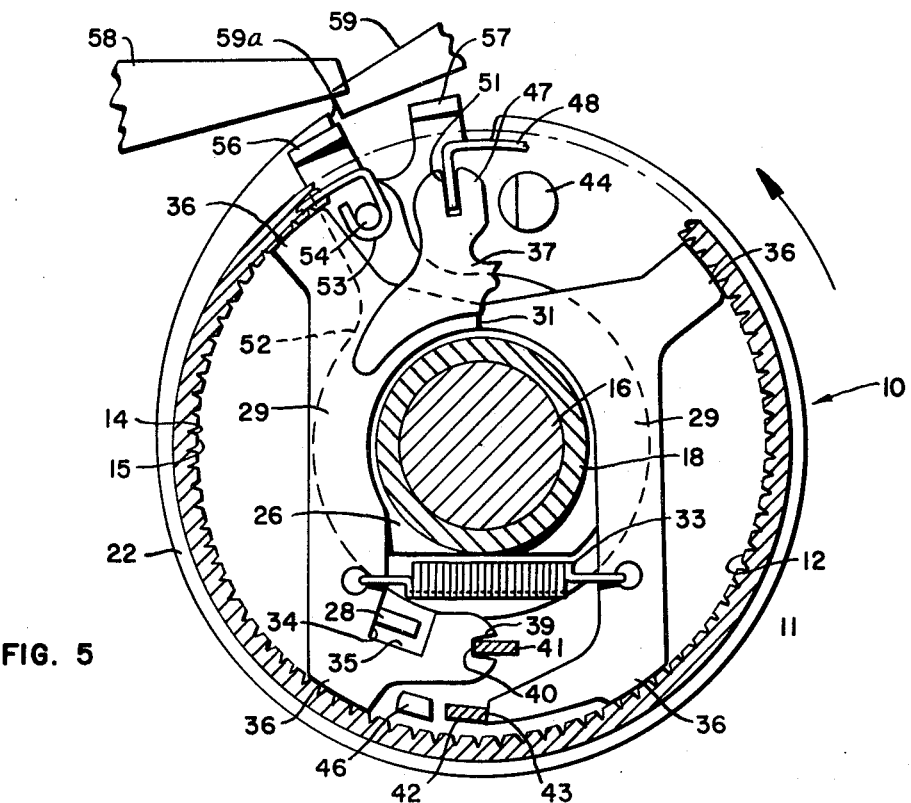
FIG. 5 is a view similar to FIG. 3 but differing in that the friction shoes are engaged with the driving drum to couple the driven disc to the driving drum.

Referring now to FIGS. 1, 3, and 5, there are shown a pair of frames 29 which form part of the clutching device 27. The frames are positioned within the drum 11 for selective engagement with the grooved inner diameter 12 and function in a manner similar to the frames described in the patent to A. N. Nilson et al., U.S. Pat. No. 2,568,249, issued Sept. 18, 1951. The frames 29 abut each other at a pivot juncture 31 and surround the sleeve 18 which carries the driven member or clutch disc 22. Unlike the clutch disc 22, the frames 29 are not rigidly mounted on the sleeve 18 but are mounted slidably within a slot 32 on the sleeve and may rotate relative to the sleeve between flange 26 and a flange 32a parallel thereto. In order to urge the frames within the slot on the sleeve, a coil spring 33 is connected under tension between the frames.

The driving lug 28 which projects from the clutch disc 22 engages one of the frames 29 (see FIG. 5) on an edge 34 of a notch 35 formed in the frame, to impart rotative movement of the frames to the clutch disc. As seen in FIGS. 3-6, the slot 35 is slightly wider than the lug 28 in order to permit slight relative rotation between the frames 29 which are slidably mounted on the sleeve 18 and the clutch disc 22 which is rigidly mounted on the sleeve. A pair of smooth-faced metallic friction shoes 36 are integrally formed on each of the frames 29. Normally the shoes 36 are urged out of engagement with the inner diameter 12 of the driving drum 11 by the tensioned coil spring 33 which interconnects the two frames 29 to urge them together about the pivot point 31 and retains the frames in the slot 32 on the cam sleeve 18.

A pry bar 37 (FIGS. 1, 6, and 4) is provided for moving the friction shoes 36 into engagement with the inner diameter 12 of the driving member 11. The pry bar 37 is mounted loosely about sleeve 18 in a groove 38 formed in the sleeve between flange 32a and a flange 38a parallel thereto. The pry bar is coupled and maintained in position relative to the clutch device 27 by a projection 41 received in a notch 39 in the left-hand frame 29 and a second projection 42 formed on the pry bar 37 which engages a tip 43 of the right-hand frame 29. The tensioned spring 33 urges the lower end of the left-hand frame 29 into engagement with the lug 41 and the lower end of the right-hand frame 29 into engagement with the lug 42. The forces acting on lugs 41 and 42 impart a clockwise rotation moment tending to rotate the pry bar 37 about an imaginary axis 40 located relative lugs 41-42 as shown. The rotative moment urges a nub 47 on the pry bar 37 against a projection 44 extending from the clutch disc 22. The nub 47 has an inwardly extending slot 51 for receiving an anchoring lug 49 projecting from another clutching device in the form of an arcuate band spring 48.

Figure 6:
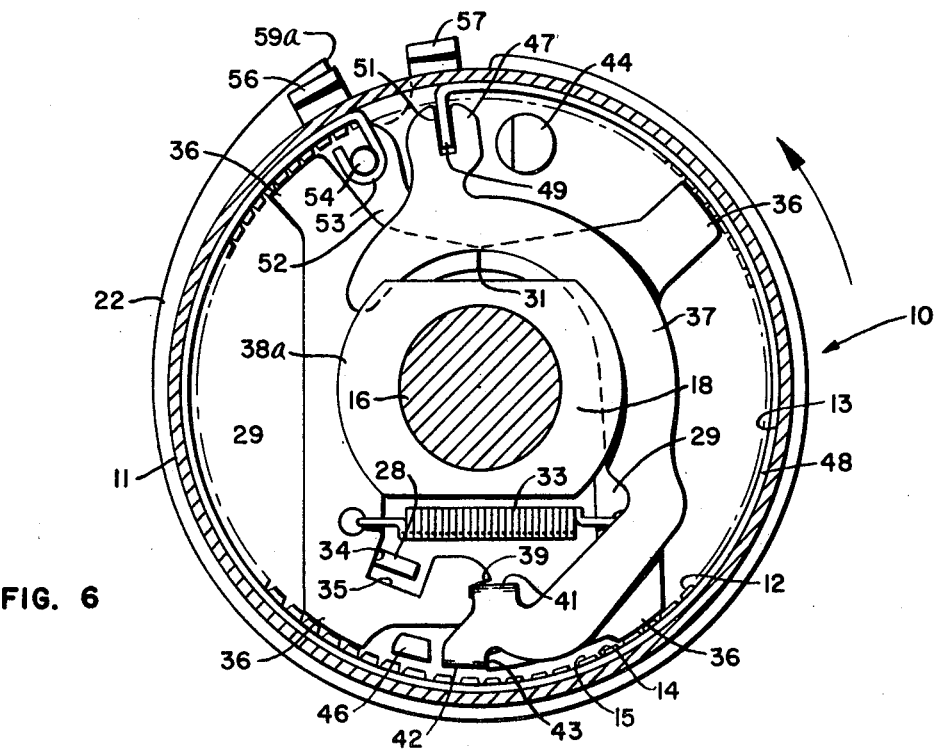
FIG. 6 is a view similar to FIG. 4 but differing in that the band spring is engaged with the driving drum and is biasing the friction shoes into engagement with the drum.

The band spring 48 is attached at its other end to an actuator arm 52 by a loop portion 53 which receives a pin 54 projecting from the actuator arm. When the band spring 48 is contracted or tensioned, it is disengaged from the inner diameter 13 as shown in FIGS. 5 and 6 and exerts a force pulling the pry bar nub against the projection 44. As best seen in FIG. 2, the actuator arm 52 is positioned between the flange 26 and the clutch disc 22 and is rotatively mounted about flange 25a for enabling actuator arm release, as will become apparent hereafter. When the clutch 10 is in the disengaged condition illustrated in FIGS. 3 and 4, a stop lug 57 projecting from the clutch disc 22 engages the detent 56 of the actuator arm 52. This effect results when a clutch trip 58 external to the clutch moves from the condition shown in FIG. 5 (clutch engaged) to the condition of FIG. 3 to cause clutch disengagement. Simultaneously, a latch 59 which is external to the clutch and normally biased against the periphery of the clutch disc when the clutch is engaged as in FIG. 5, will be engaged with surface 59a which is then in line with the latch. As a result, reverse movement of the disc due to spring tension is prevented. That is to say, the clutch disc and lug 44 are held against clockwise movement; and consequently, lug 49 is anchored against clockwise movement and the band spring is prevented from untensioning by nub 47 which abuts the now held lug 44. Further, with the clutch disengaged, the clutch trip 58 engages the detent 56 to hold the actuator arm 52 against counterclockwise movement. Inasmuch as the actuator arm 52 is held, the actuator pin 54 is also held, as is the loop portion 53 of the band spring 48, so that the band spring is held contracted and spaced from the inner diameter 12 of the drum 11.

OPERATION

Figure 4:
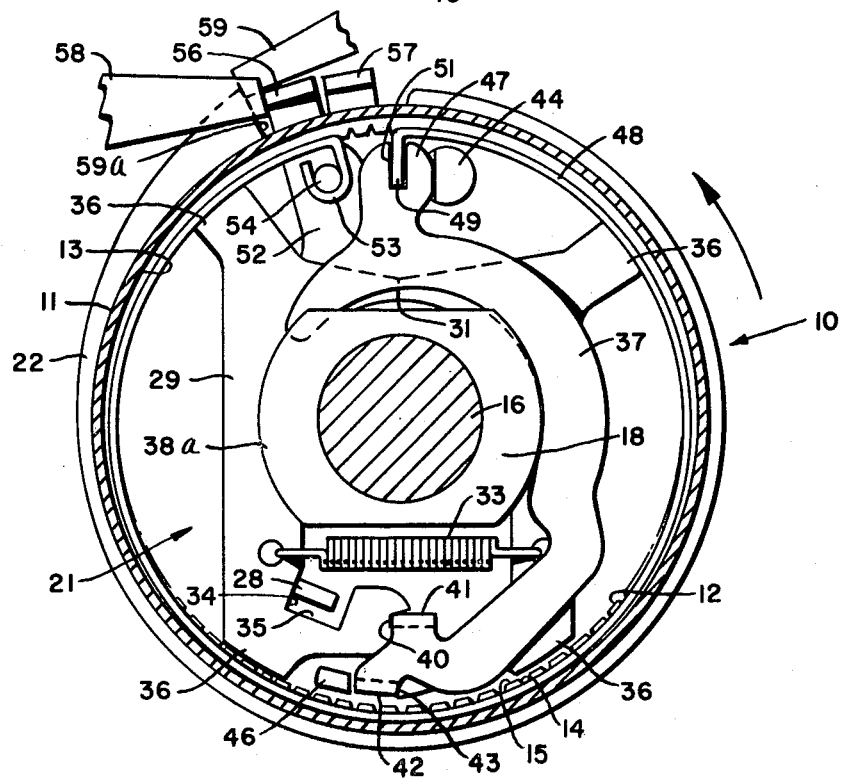
FIG. 4 is a transverse sectional view taken substantially along the line 4—4 of FIG. 2 in the direction of the arrows and showing a band spring which is disengaged from the driving drum so as not to bias the friction shoes into engagement with the drum.

Referring now to FIGS. 3 and 4, the clutch 10 is shown in the disengaged condition where the friction shoes 36 are disengaged from the grooved inner diameter 12 of the driving drum 11 to allow the driving drum to rotate relative to the sleeve 18. The clutch trip 58 is engaged with the detent 56 on the actuator arm 52 and the latch 59 is engaged with surface 59a, on the clutch disc 22. The band spring 48 is held out of engagement with the smooth inner diameter 13 (FIG. 4) of the drum 11 since the lug 49 of the band spring is restrained by the abutment of the clutch disc projection 44 with the nub 47 on the pry bar 37 while the other loop end 53 of the band spring is restrained by the pin 54 on the now held actuator arm 52. When the band spring 48 is in this position the pry bar 37 is held in the clockwise rotated position about the axis 40 between the projections 41 and 42 on the pry bar. With the pry bar 37 in this position, the tension spring 33 is effective to hold the frames 29 spaced from the rotating drive drum.

Referring again to FIGS. 3 and 4, when it is desired to engage the clutch 10, a start signal impulse effectuates the disengagement of the trip 58 from the detent 56 to allow the detent 56 and the actuator arm 52 to rotate in the counterclockwise direction under the influence of the now released band spring 48 which untensions and expands circumferentially into frictional, clutching engagement with the inner diameter 13 of the driving drum 11. As the band spring 48 now moves with the drum 11 it will cause the pry bar 37 to pivot about axis 40 in a counterclockwise direction away from the clutch disc projection 44. As the pry bar 37 pivots counterclockwise, its movement is angular about axis 40 and urges the right-hand frame 29 counterclockwise about the pivot juncture 31 into engagement with the drum 11. As a result, torque is applied to the left-hand frame 29 at junction 31 and causes its shoes 36 into clutching engagement with the grooved inner diameter 12 of the driving drum against the tension of spring 33. When the friction shoes 36 engage the drum 11 they will start rotating with the drum in the counterclockwise direction. Whereupon, the left-hand frame 29 rotates the clutch disc 22 by engaging the projection 28 on the clutch disc with the edge 34 of the slot 35. Since the clutch disc 22 is fixedly mounted to the sleeve 18, the sleeve will also rotate with the drum 11 and the shaft 16.

The clutching action of the shoes is regenerative, that is, once the clutching engagement is attained, the shoes tend to force each other in tighter frictional engagement with the drum as explained in the aforementioned patent to W. J. Zenner U.S. Pat. No. 2,568,249.

The rate at which the friction shoes 36 engage the inner diameter of the driving drum 11 is determined by the speed at which the band spring 48 is carried by the driving drum. If the drum 11 is rotating at a high rate of speed, the band spring 48 will rotate rapidly and rapidly pivot the pry bar 37 about axis 40 to overcome the force of the coil spring 33 and rapidly urge the friction shoes 36 into engagement with the inner diameter 12 of the drum with a relatively high momentum or force. However, if the drum 11 is rotating at a relatively slow speed the band spring 48 will also move at a relatively slow speed after engaging the drum and will, in turn, pivot the pry bar 37 at a relatively slow speed so as to cause the friction shoes 36 to engage the drum at a relatively slow rate with a relatively low momentum or force.

By relating the force of engagement of the friction shoes 36 to the speed of rotation of the drum 11, only that force which is necessary to insure a clutching engagement between the shoes 36 and the drum 11 is applied, and thus the tendency for the frames 29 to rebound and oscillate is alleviated. The clutch 10 will consistently operate over long periods of time because the clutching action is attained by eliminating any direct spring forces to move the pry bar 37 and the shoes 36 into the clutch engaging position. No matter what the speed of the driving drum 11 may be, the friction shoes 36 will be eased in clutching position by a minimum force necessary to effectuate the clutching action thereby reducing the tendency of the frames 29 to rebound.

When it is desired to disengage the clutch 10, e.g., after a single rotation, so that the drum 11 will not cause rotation of the sleeve 18, the clutch trip 58 is moved down into the path of rotation of the detent 56 by the receipt of a stop signal in apparatus, for example, such as a printing telegraph selector magnet with which the clutch is adapted for association. While the invention is not limited to a single clutching action per shaft rotation, when the invention is embodied in single revolution clutch 10, the trip 58 may be released following receipt of the start signal and the movement of the detent 56 past the end of the trip. As the clutch 10 rotates, the detent 56 is carried into engagement with the trip 58; whereupon, the band spring 48 will be flexed and tensioned so as to decrease in diameter and disengage from contact with the inner diameter 13 while at the same time pulling on the pry bar 37 to force the pry bar nub 47 into engagement with the clutch disc projection 44. As the pry bar 37 is moved into engagement with the projection 44, it pivots clockwise about axis 40 to allow the right frames 29 to pivot inwardly about the juncture 31 and under the urging of the tensioned coil spring 33 to disengage the shoes 36 on the right frame from the inner diameter 12 of the drum 11. This clockwise movement of the right frame releases pressure from the left frame 29 whose shoes thereupon release gripping pressure on drum 11.

It should be noted that as the clutch disc 22 rotates, the latch 59 rides on the periphery 22a of the disc 22. As the clutch is disengaged, the momentum of the rotating driven elements of the clutch carry a shoulder 59a generated in periphery 22a past the end of latch 59. Thereupon, latch 59 is drawn by a spring (not shown) to a position behind the shoulder 59a thereby completing the locking of the detent 56 and lug 57 from undesireable separation. This detent 56 and lug 57 through the agency of the projections 44 and 54 hold the band spring in the contracted disengaged position so that the spring 33 is effective to hold the shoes 36 spaced from the drum 11.

While certain specific examples and embodiments of the invention have been described in detail above, it will be apparent that various modifications may be made from the specific details described without departing from the spirit and scope of the invention.

I CLAIM:

1. In a clutch:
   a drum;
   a first clutching device;
   means for urging the first clutching device from clutching engagement with the inner periphery of the drum;
   a second clutching device in the form of a flexed band spring engaging the inner periphery of the drum;
   a pivotally mounted pry bar held by said band spring and acting against said urging means for holding the first clutching device in clutching engagement with the inner periphery of the drum; and
   means for flexing the band spring from engagement with the inner periphery of the drum to pivot the pry bar to disengage the first clutching device from the drum.

2. A selectively operable coupling device comprising:
   a first member,
   a second member axially aligned with said first member and positioned adjacent to said first member,
   means for engaging said first member, said engaging means mounted on said second member and positioned adjacent to said first member to couple said second member to said first member,
   resilient means positioned adjacent to said first member for engagement therewith,
   means for holding said resilient means from engagement with said first member, means for releasing said holding means to release said resilient means to engage with said first member, and a prying member engaging the resilient means at one end and abutting the engaging means at the other end for coupling the engaging means to the resilient means.

3. The device of claim 2 wherein said first member is a drum having a peripheral surface which is engaged by both said engaging means and said resilient member.

4. The device of claim 3 wherein said resilient means is a substantially arcuate spring positioned adjacent to said peripheral surface of said drum for engagement therewith when released and disengaged therefrom when tensioned.

5. The device of claim 2 which includes means coupled to the engaging means for urging the engaging means out of engagement with the first member and which is overcome by the released resilient means.

6. In a clutch:

a rotating driving drum;

a driven member axially aligned with the drum and positioned adjacent thereto;

an arcuate resilient band positioned within the drum for engaging an inner surface of the drum;

means for holding the band contracted and spaced from said inner surface;

a plurality of clutching elements coupled to the driven member for movement into engagement with said inner surface of said drum to drive said driven member;

means for enabling release of said holding means to expand the band into clutching engagement with said inner surface; and a pry bar rotatably mounted on said driven member and connected to one end of said band for interconnecting the band and said clutching elements to move said clutching elements into engagement with said inner surface at a speed determined by the speed of rotation of said driving drum.

7. The clutch of claim 6 wherein the holding means includes:

an arm attached to the other end of said band for engagement by said releasing means, and stop members projecting from said driven means for engagement with said pry bar and with said arm to hold said band contracted and spaced from said inner surface when said arm is engaged by said releasing means.

8. A clutch for selectively transmitting rotary motion from a constantly rotating shaft to a driven member comprising:

a drum attached to the constantly rotating shaft for rotation therewith, a sleeve for carrying the driven member rotatably mounted adjacent to said drum, a disc rigidly mounted on said sleeve for rotation therewith, a plurality of friction shoes movably mounted on said disc to engage said drum and rotate said disc, a prying member engaging said friction shoes for camming said friction shoes into engagement with said drum, a substantially arcuate tensioned spring positioned adjacent to said drum and attached to said prying member for movement into engagement with said drum, and means mounted on said sleeve and attached to said resilient member for releasing said tensioned spring to engage and rotate with said drum and to subsequently urge said prying member to cam said friction shoes into engagement with said drum with a force that is determined by the speed of rotation of said drum.

* * * * *